United States Patent [19]

Yoshimura et al.

[11] Patent Number: 4,991,135
[45] Date of Patent: Feb. 5, 1991

[54] ELECTRONIC DICTIONARY

[75] Inventors: Motokazu Yoshimura, Nagoya; Tsuyoshi Nishibu, Gifu; Seiko Ishikawa, Hekinan, all of Japan

[73] Assignee: Brother Kogyo Kabushiki Kaisha, Aichi, Japan

[21] Appl. No.: 733,587

[22] Filed: May 13, 1985

[30] Foreign Application Priority Data

May 18, 1984 [JP] Japan ................ 59-101387

[51] Int. Cl.⁵ .................. G06F 7/00; G06F 12/00
[52] U.S. Cl. .................. 364/900; 364/962; 364/963; 364/963.1
[58] Field of Search .................. 364/900 MS File

[56] References Cited

U.S. PATENT DOCUMENTS

| | | | |
|---|---|---|---|
| 4,355,370 | 10/1982 | Yanagiuchi | 364/900 |
| 4,355,371 | 10/1982 | Convis et al. | 364/900 |
| 4,367,537 | 1/1983 | Yoshida | 364/900 |
| 4,383,307 | 5/1983 | Gibson, III | 364/900 |

*Primary Examiner*—Gareth D. Shaw
*Assistant Examiner*—J. Fairbanks
*Attorney, Agent, or Firm*—Oliff & Berridge

[57] ABSTRACT

An electronic dictionary comprising an input device, a display, a dictionary memory, a searching device, and an indicator device. The memory consists of plural divisions of equal storage capacity and stores multiple sets of word data representative of different words in an alphabetical order. Each set of word data is stored in one of the plural divisions such that each of the divisions has at its end a waste portion storing no part of any of the multiple sets of word data, if the number of characters of the first set of word data stored in the following division is larger than the number of characters which may be stored in the waste portion. In response to input data entered through the input device, the display displays the input data, and the searching device finds, in a binary search process, one of the plural divisions of the memory which is assigned to store the set of word data representative of the input data, and scans the found division to search the set of word data representative of the input data. The indicator device indicates whether the set of word data representative of the input data has been found or not.

6 Claims, 5 Drawing Sheets

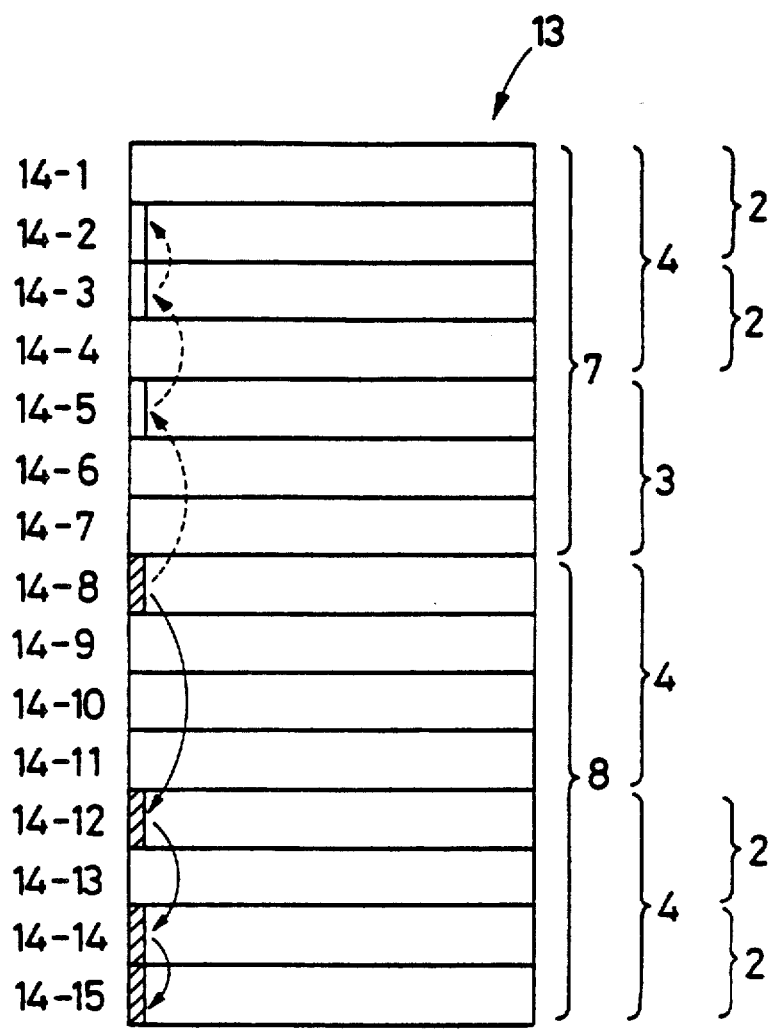

ELECTRONIC DICTIONARY

BACKGROUND OF THE INVENTION

1. Field of the Art

The present invention relates in general to an electronic dictionary device, and more particularly to an arrangement of a memory incorporated in the device to store word data representative of multiple words and search means for scanning the memory to find the word data representative of input data entered through operator-controlled keys.

2. Related Art Statement

In a known dictionary memory storing word data which represent a host of words of a language, for example, a list of English words in an alphabetical order, word data corresponding to a desired word must be searched by scanning the dictionary memory from the beginning of the memory while checking the invididual sets of word data against the desired word to be searched. This type, of searching is not satisfactory in terms of searching time required.

In addition, a so-called "binary search" or "dichotomizing search" is known, wherein memory locations storing individual sets of word data are provided with respective data-identification pointers. In this binary search process, the data storage area of a memory is divided into two parts, one of which is rejected and the other of which is accepted, based on whether these parts contain the word data in question. The process is repeated on the accepted part until the desired word data is found in the corresponding memory location. This binary or dichotomizing search process is advantageous for its faster searching capability.

More specifically described, binary searching involves individual memory locations corresponding to alphabetically arranged different words are given respective addresses Nl through Nn, as illustrated in FIG. 1. In the first step of a binary search, the entire area of the memory defined by the first address Nl and the last address Nn is divided into two parts by locating an (not shown) address Nt intermediate between Nl and Nn. The intermediate address Nt is obtained as Nt =(Nl +Nn)/2. If the obtained value Nt is not a whole number or integer, the address number Nt is determined to be a value of the integer part of the value (Nl + Nn)/2 as obtained, plus 1. The word data stored at the intermediate address Nt is retrieved, and compared with the desired data (data representing a desired word). If the retrieved data is not identical to the desired data, a check is made as to whether the desired data is stored at an address number smaller than the intermediate address number Nt, or at an address number larger than the to address Nt. If the checking reveals that the desired data is stored at an address number smaller than the intermediate address number Nt, the first part of the memory between the first address Nl and the intermediate address Nt is further divided into two sections. On the other hand, if the desired data is found to be stored at an address number larger than the intermediate address number Nt, the second part of the memory between the intermediate address Nt and the last address Nn is divided into two sections. In dividing the first or second part into two sections, an address number intermediate between Nl and Nt or between Nt and Nn is obtained in the same manner as indicated above. Then, the data stored at the newly obtained intermediate address is retrieved for comparison with the desired data, to find one of the two sections that is assigned to contain the desired data. The above binary search process is repeated on the accepted part or section until the memory location storing the desired data has been found.

Although the binary search permits a faster searching operation, it requires that the individual memory locations identified by the respective addresses have the same storage capacity. Hence, all memory locations should have a storage capacity which is sufficient to store the longest word or words which are stored in the dictionary memory. In other words, the storage capacity of each memory location should correspond to the number of characters of the longest word or words. In this arrangement of the memory, the memory locations tend to have considerably large waste portions which are not used.

If a series of word data is successively stored end to end in alphabetical order in a dictionary memory, on the other hand, the total storage capacity required is reduced. In this case, however, it is impossible to practice the binary or dichotomizing search process, and extra searching time is required.

SUMMARY OF THE INVENTION

It is accordingly an object of the present invention to provide an electronic dictionary having a dictionary memory storing multiple sets of word data representative of different words of varying lengths in alphabetical order, wherein the dictionary memory enjoys a fast searching feature of the binary search process, as well as a high rate of utilization of its memory areas, thereby reducing the searching time and the overall storage capacity required.

According to the present invention, there is provided an electronic dictionary comprising: (a) input means for entering input data consisting of at least one character; (b) display means for displaying the input data entered through the input means; (c) a dictionary memory consisting of plural divisions of equal storage capacity for storing multiple sets of word data of various lengths in alphabetical order, each of the multiple sets of word data being stored in one of the plural divisions of the memory such that each of the plural divisions has at its end a waste portion storing no part of any of the multiple sets of word data, when the number of characters of the first set of word data stored in the division following said each division is larger than the number of charcters that may be stored in the waste portion of said each division; (d) search means for finding, in a binary search process, one of the plural divisions of the dictionary memory which is assigned to store the set of word data representative of the input data entered through the input means, the search means scanning said one of the plural divisions to search the set of word data representative of the input data; and (e) indicator means for indicating whether said set of word data representative of said input data has been found or not.

In the electronic dictionary constructed according to the invention as described above, the waste portions of the dictionary memory are produced only at the terminal parts of the plural divisions, and only when the waste portion if provided in the corresponding division of the memory is not sufficient in capacity to store the first set of word data stored in the following division. Accordingly, the waste of the dictionary memory is considerably reduced. Further, a binary search may be practiced to find the division of the memory that is assigned or supposed to contain the word data representative of the input data. Therefore, only the division which has been selected in a relatively short time by way of the binary search has to be scanned from the beginning to find the word data representative of the input data. In summary, the instant arrangement permits relatively high utilization of the dictionary memory, and at the same time allows the practice of the binary search process, which is conducive to reduced overall searching time.

According to one embodiment of the invention, the number of the plural divisions of the dictionary memory is equal to $2^n$, where "n" is a positive whole-number exponent.

According to another embodiment of the invention, the indicator means causes the display means to display the input data in a flickering manner when the set of word data representative of the input data has not been found, and causes the display means to display the input data in a normal manner when the set of word data representative of the input data has been found.

In accordance with another embodiment, the input means comprises multiple character keys corresponding to characters, and a space key, the search means initiating the binary or dichotomizing search process upon operation of the space key after the input data has been entered by operating at least one of the character keys.

The electronic dictionary of the invention may be adapted so that first control means enables the display means to display the input data upon entry thereof through the input means, and that the indicator means comprises second display control means which enables the display means to indicate whether the set of word data representative of the input data has been found or not.

According to the invention, there is also provided a word processor which incorporates the electronic dictionary constructed according to the invention as described above. The dictionary memory which stores an alphabetic list of words, search means which is capable of binary search, and indicator means which indicates whether the input data has been found or not, cooperate to provide means for checking whether a word has been correctly entered through the input means. Namely, the word processor according to the invention is capable of checking individual entered words for misspelling, against the list of words stored in the dictionary memory. As is apparent from the foregoing discussion, this misspelling check may be accomplished in a short time owing to the utilization of a binary search process, and with a relatively small storage capacity of the dictionary memory.

BRIEF DESCRIPTION OF THE DRAWINGS

The above and other objects, features and advantages of the present invention will become more apparent from reading the following description of preferred embodiments, when considered in connection with the accompanying drawings, in which:

FIG. 6 is a view illustrating a modified arrangement of the dictionary memory.

DETAILED DESCRIPTION OF THE PREFERRED EMBODIMENTS

Referring to FIGS. 2-5, a preferred embodiment of the invention will be described in detail to further clarify the concept of the invention.

Figure 2:
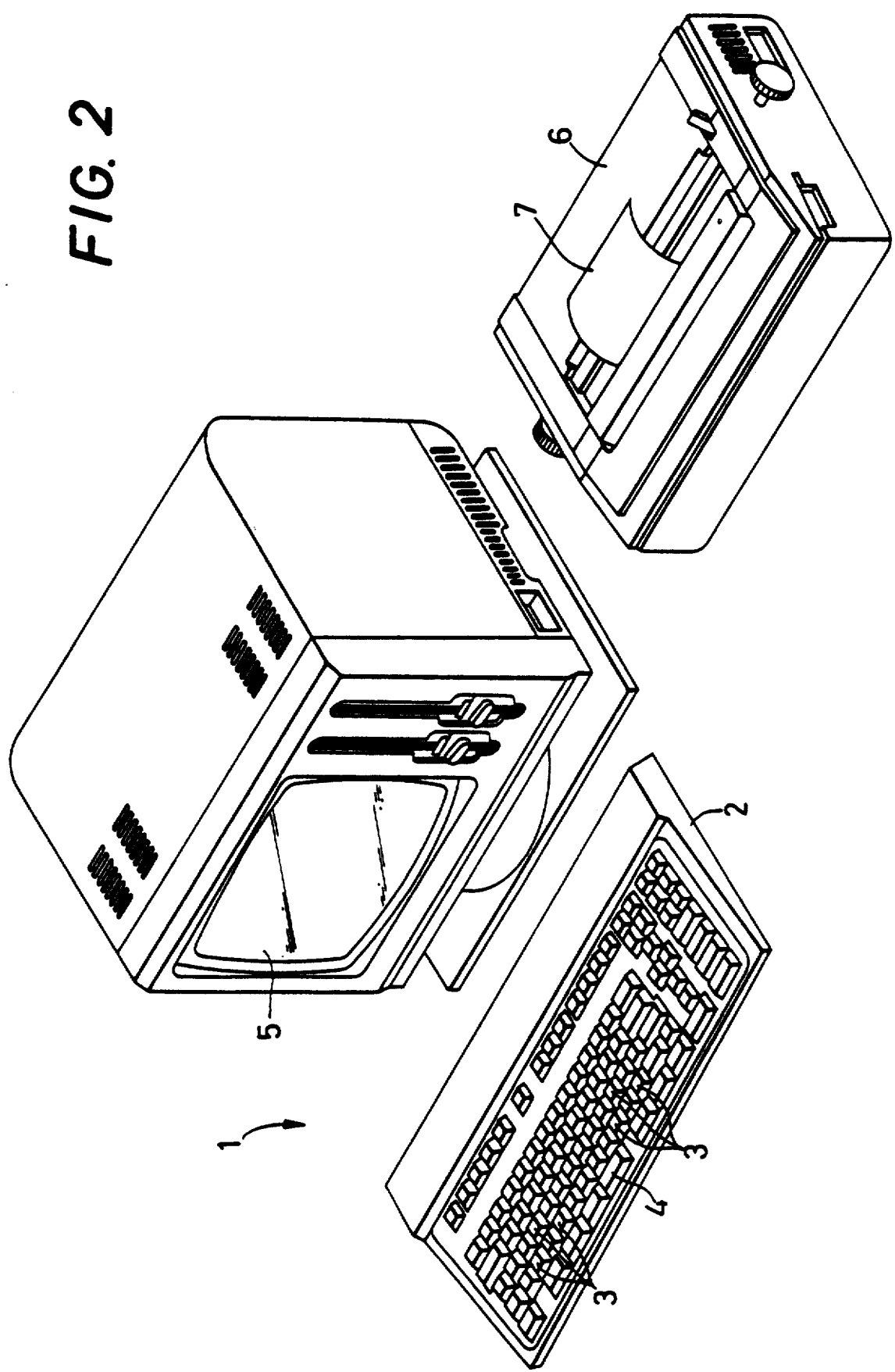
FIG. 2 is a perspective view of a word processor embodying the present invention.

There is shown in FIG. 2 a word processor 1 adapted for dealing with languages using alphabetic letters. The word processor 1 comprises input means in the form of a keyboard 2 which provides a host of keys including multiple character keys 3, and a space key (space bar) 4. The character keys 3 correspond to alphabetic letters, digits (numerals) and symbols. With these character keys 3 operated, desired data such as English words and numbers may be entered as input data. Behind the keyboard 2, there is provided a cathode ray tube 5 (hereinafter referred to as "CRT 5") which displays input data (words, numbers, etc.) which have been entered through the character keys 3. The input data may be printed on a sheet of paper 7 by a printer 6 disposed to the right of the CRT 5.

Figure 1:
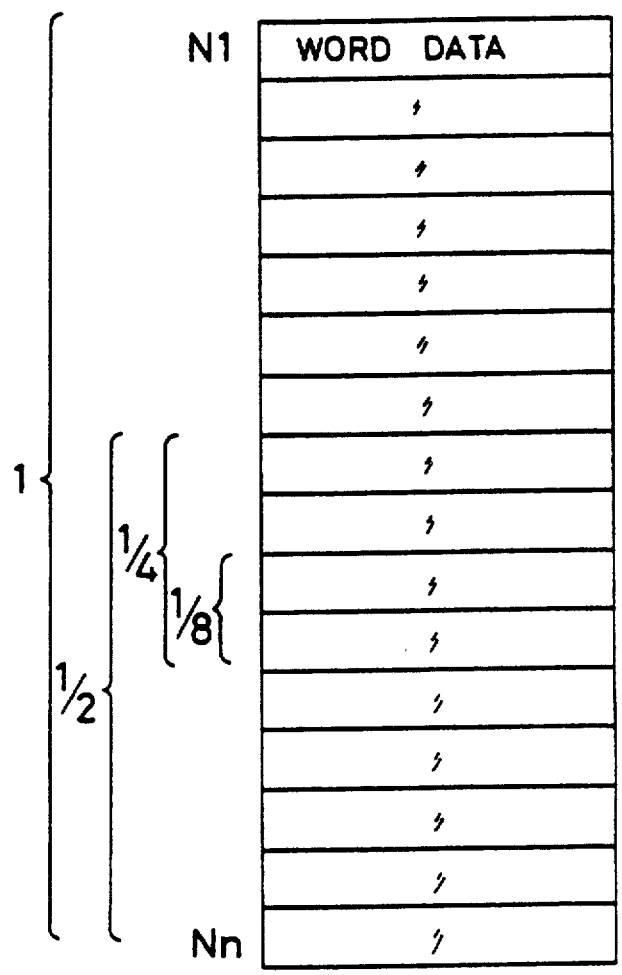
FIG. 1 is a diagram illustrating memory locations of a dictionary memory adapted to perform a binary search.
Figure 3:
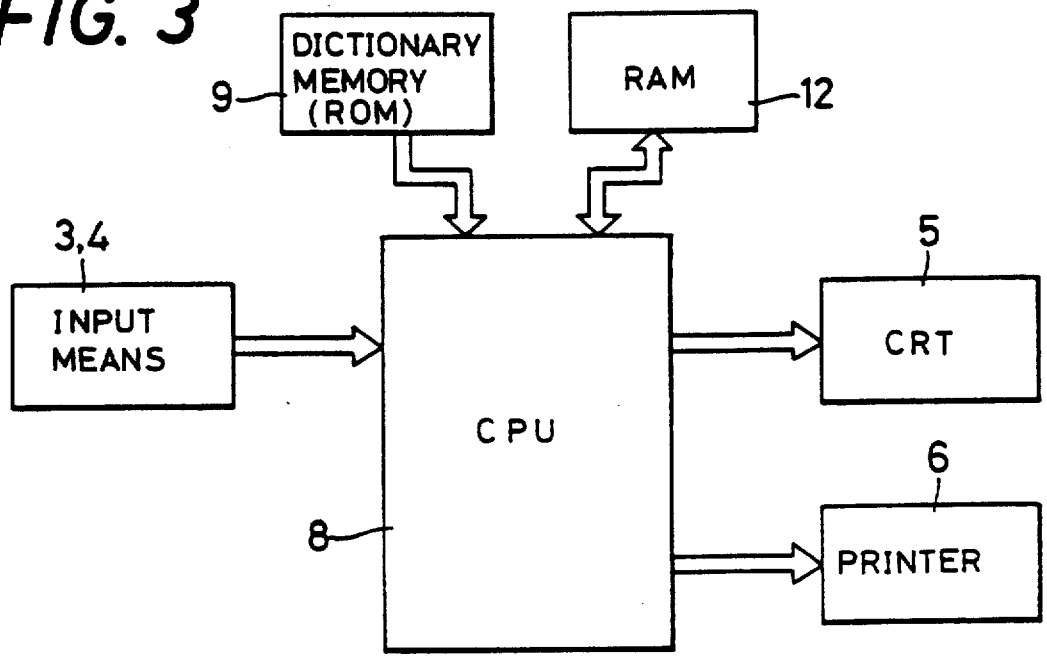
FIG. 3 is a schematic block diagram of an electric control system of the word processor.

The word processor 1 comprising the keyboard 2, CRT 5 and printer 6, is controlled by an electric control system as illustrated in FIG. 3.

The control system uses a central processing unit 8 (hereinafter called "CPU 8"which serves as display control means, search means and indicator means, as described later in detail. The CPU 8 receives input data from the keyboard 2, such as character data from the character keys 3, and causes the CRT 5 to display the entered words or other information.

Figure 4:
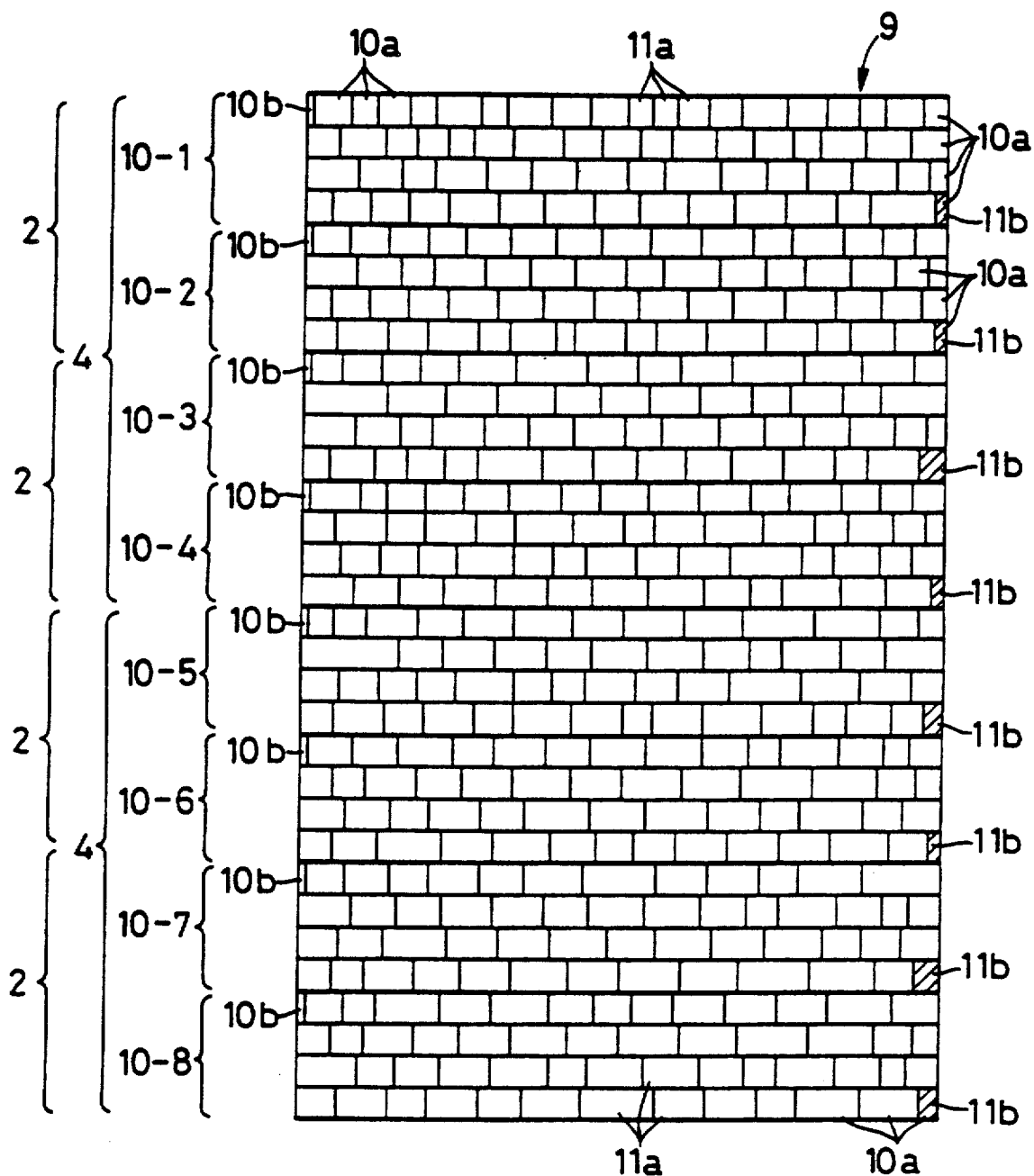
FIG. 4 is a diagrammatic illustration of a dictionary memory incorporated in the word processor of FIG. 2.

The control system includes a dictionary memory in the form of a read-only memory 9 (ROM 9), as shown in Fig. 4, which consists of plural divisions 10 of equal storage capacity, i.e., eight equal storage divisions 10-1 through 10-8, in this specific embodiment. Each division 10 has a large number of memory locations 10a. Multiple sets of word data 11a representative of many dictionary entries or words of varying lengths are stored in the respective memory locations 10a of the divisions 10, so that the word entries represented by the word data 11a are arranged in an alphabetical order. As depicted in FIG. 4, the sizes of the memory locations 10a correspond to the number of characters of words represented by the word data which are stored therein. That is, each memory location 10a has no waste area. The plural divisions 10 may have a waste portion at its last memory location 10a, in the case where the last memory location 10a in the division 10 is not large enough in capacity to store the set of word data which is to follow the set of word data that is actually stored last in the division 10. In other words, the number of characters of the first set of word data stored in each division 10 is larger than the number of characters which may be stored in the waste portion 10a, i.e., in the last memory location The waste portions 10a, if provided in the divisions 10, store dummy data 11b which are not treated as word data. Each of the eight divisions 10 has a flag 10b at its leading end, which flag 10b has two stable states, i.e., logical "1" or "0". These flags 10b are used to specify a range of the binary or dichotomizing search. More specifically, the two flags 10b in the different two divisions 10, whose states are "1", define a range of the dictionary memory 9 which is divided into two parts when a binary search is executed, as described later.

The control system of the present invention further includes a working memory in the form of a random-access memory 12 (RAM 12) which temporarily stores the character data entered through the character keys 3, and the word data read out from the dictionary memory 9 by the CPU 8.

To check if a set of word data representative of the input data entered through the character keys 3 is present in the dictionary memory 9, the CPU 8 first executes a binary search to find the division 10 which is assigned to store the word data representative of the input data, and then scans the found division 10 to search the word data representative of the input data. When the CPU 8 judges that the word data representing the input data is not present in the dictionary memory 9, the CPU 8 causes the CRT 5 to display the input data in a flickering manner, thus indicating that the entered data is not stored in the dictionary memory 9.

Figure 5:
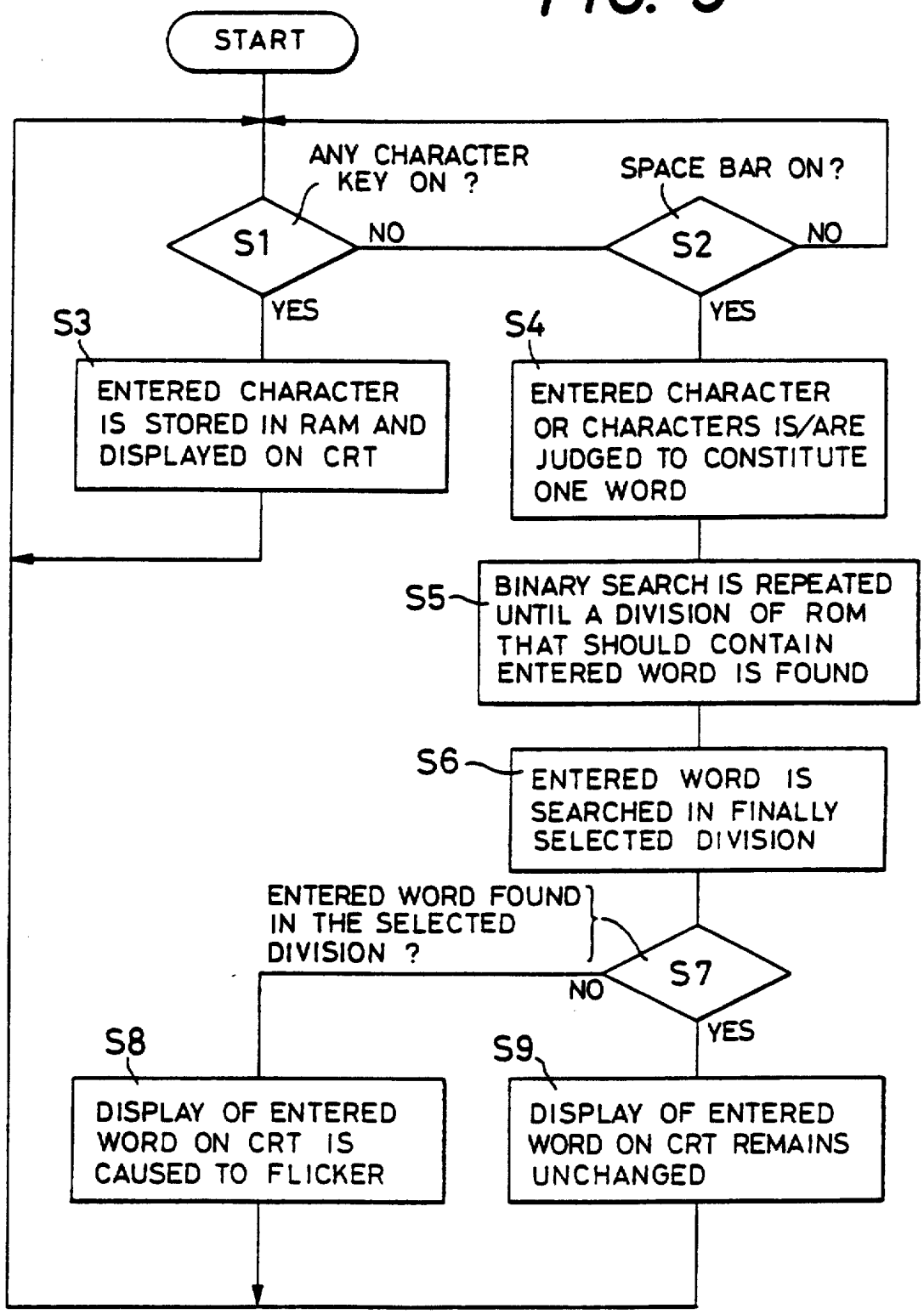
FIG. 5 is a flow chart showing the operation of a central processing unit (CPU) of the control system.

The operation of the word processor 1 will be described by reference to a flow chart of FIG. 5. For easy understanding, step numbers following the letter S are given in FIG. 5, and inserted in parentheses in the following description.

If, for example, a word "TAKE" is entered through the appropriate character keys 3 (step S1), the corresponding character data "T", "A", "K" and "E" are stored in the working memory 12, and letters "T", "A", "K" and "E" are displayed one after another on the CRT 5 according to the character data in the working memory 12 (step S3). Described in more detail, each time the character keys "T", "A", "K", "E" are operated, the CPU 8 executes step S1 and step S3 to store the corresponding character data in the RAM 12 and display the corresponding letter on the CRT 5. Thus, the word "TAKE" is displayed.

Successively, the space key 4 is operated (step S2). As a result, the CPU 8 judges that the entered character data "T", "A", "K" and "E" constitute a set of word data (step S4). Then, the CPU 8 proceeds with a binary search (step S5).

The binary search process in step S4 will be described with reference to FIG. 4. Initially, the CPU 8 sets the flags 10b in the first and last (eighth) divisions 10-1 and 10-8 of the memory 9 to logical "1". Then, the CPU 8 finds the division 10 which is intermediate between the first and last divisions. This finding is made by adding "1"(number of the first division 10-1) and "8"(number of the last division 10-8), and dividing the sum "9" by two. Namely, the quotient "4.5"is obtained. In this case, a value "1"is added to the integer value "4"of the quotient, and the sum "5"is used as the number indicating the intermediate division. Thus, the division 10-5 is determined as the intermediate division. The CPU 8 then retrieves the set of word data 11a stored in the first memory location 10a of the intermediate division 10-5, and temporarily stores the retrieved word data in the working memory 12. Subsequently, the CPU 8 compares the retrieved word data 11a with the input data "TAKE" which has been previously entered through the character keys 3.

If the set of word data "TAKE" (corresponding to the input data) is stored in the fourth memory location 10a of the seventh division 10-7 of the dictionary memory 9 as shown in FIG. 4, the CPU 8 judges that the retrieved data 11a is not identical to the word data "TAKE", and then repeats the binary search.

Stated in greater detail, the CPU 8 judges whether the retrieved data 11a in the first memory location 10a of the intermediate or fifth division 10-5 is stored before or after the word data "TAKE" in the alphabetical order. Since the retrieved data 11a is located before the word data "TAKE" in this specific example, the CPU 8 sets the flag 10b of the first division 10-1 to logical "0", and sets the flag 10b of the intermediate division 10-5 to logical "1", so that the binary search is executed on the four divisions 10-5 through 10-8, i.e., on the latter half of the memory 9 in which the input data "TAKE" is supposed to be stored.

The CPU 8 divides the latter half of the memory 9 into two parts by determining the intermediate division which is intermediate between the fifth division 10-5 and the last or eighth division 10-8. This determination is made by adding "5"(number of the fifth division 10-5) and "8"(number of the last division 10-8), and dividing the sum "13"by two. As previously indicated, a value "1"is added to the integer part "6"of the obtained quotient "6.5", and the seventh division 10-7 is determined as the intermediate division. Then, the word data 11a stored in the first memory location 10a of the newly determined intermediate division 10-7 is retrieved and stored in the working memory 12. The retrieved word data 11a is compared with the input data "TAKE" to judge whether the retrieved word data 11a is identical to the input data "TAKE".

Since the word data 11a stored in the first memory location 10a of the seventh division 10-7 is not identical to the input data "TAKE", the CPU 8 judges whether the retrieved word data 11a is stored before or after the word data "TAKE". In this example, the retrieved word data 11a is located after before the word data "TAKE", since the CPU 8 sets the flag 10b of the fifth division 10-5 to logical "0"and sets the flag 10b of the seventh division 10-7 to logical "1". As a result, the last two divisions 10-7 and 10-8 are subjected to a third binary search, wherein the intermediate division is obtained by adding "7"and "8", dividing the sum "15" by two, and adding "1"to the integer part "7" of the obtained quotient "7.5". Namely, the word data 11a stored in the eighth (last) division 10-8 is retrieved and compared with the input data "TAKE". Since the retrieved word data 11a is stored after the word data "TAKE", the seventh division 10-7 is eventually selected or accepted as the division which is supposed to store the word data representative of the input data "TAKE".

While the second binary search is executed on the second half (divisions 10-5 through 10-8) of the dictionary memory 9 in this specific example, the similar steps are taken when the word data representative of the input data is judged to be stored in the first half of the memory 9. In this case, the intermediate division in the second binary search is obtained by adding "1"and "5"(number of the first obtained intermediate division 10-5), and dividing the sum "6"by two. Namely, the third division 10-3 is determined as the intermediate division. In the same way, the third binary search is made, for example, by adding "1"and "3" and dividing the sum "4" by two. Thus, whole-number quotients are always obtained in the second and subsequent binary searches when the first half of the memory 9 is accepted in the first binary search. Specifically, the first binary search divides the memory 9 into two parts each of which consists of four divisions, and the second binary search divides the accepted part into two sections each consisting of two divisions. Finally, the third binary search divides the accepted section into two divisions, one of which is selected as the division which is scanned to search the word data representative of the input data. In this example wherein the number of the divisions 10 is equal to $2^n$ where "n" is a positive whole-number exponent, a binary search division is always effected into two equal parts (two parts each, consisting of an equal number of divisions).

After the seventh division 10-7 has been finally selected in step S5, the CPU 8 scans the seventh division 10-7, beginning at the first memory location 10a, by way of retrieving the sets of word data one after another (step S6). Each retrieved set of word data is compared with the input data "TAKE" to check if the retrieved data represents the input data "TAKE" (step S7).

If the set of word data representative of the input data "TAKE" has not been found in the finally accepted division 10-7, the CPU 8 causes the word "TAKE" displayed on the CRT 5 to flicker. That is, the CPU 8 serves as indicator means for enabling the CRT 5 to provide a warning indication that the dictionary memory 9 does not store the word data which represents the input data. With this warning given on the CRT 5, the operator is alerted of the possibility that the input data has been erroneously entered, whereby the misspelling of words may be corrected.

In the illustrated example, however, if the word data "TAKE" is actually stored in the fourth memory location 10a of the seventh division 10-7, the CPU 8 judges that the input data "TAKE" is identical to the stored word data "TAKE" (step S7). In this instance, the display of the word "TAKE" on the CRT 5 remains unchanged (step S10).

While the present invention has been described in its preferred embodiment, it is to be understood that the invention may be otherwise embodied with various changes and modifications. For example, the number of divisions 10 of the dictionary memory 9 is not limited to $2^n$ where "n" is a positive whole-number exponent, as in the illustrated embodiment in which eight ($2^3$) divisions 10-1 through 10-8 are provided. In this connection, it is noted that the concept of the present invention may be practiced with the previously indicated advantages of fast searching and reduced storage capacity requirement of the dictionary memory, as long as the dictionary memory consists of plural divisions of equal storage capacity. For instance, it is possible that the electronic dictionary according to the invention may use a dictionary memory 13, as shown in FIG. 6, which consists of 15 equal divisions 14-1 through 14-15.

In the modified embodiment of FIG. 6 the first binary search is effected by dividing the memory 13 into two parts one of which consists of seven divisions 14-1 through 14-7, and the other of which consists of eight divisions 14-8 through 14-15. More specifically, in the first binary search, "1" and "15" are added and the sum "16" is divided by two, whereby the quotient "8" is obtained as the number indicating the intermediate division 14-8. If the second half (divisions 14-8 through 14-15) is selected or accepted in the first binary search, the second binary search is effected by adding "8" and "15" and dividing the sum "23" by two, whereby the quotient "11.5" is obtained. In this case, a value "1" is added to the integer part "11" of the obtained quotient. Thus, the the division 14-12 is determined in the second binary search as the intermediate division. In the same manner, the subsequent binary search processes are effected. As indicated in FIG. 6, the second and subsequent binary searches in the second half of the memory 9 are effected such that the memory area is always divided into two parts which consists of an equal number of divisions. If the first half of the dictionary memory 9 is accepted in the first binary search, however, the second binary search divides the memory area into two parts one of which consists of the first four divisions 14-1 through 14-4, and the other of which consists of the following three divisions 14-5 through 14-7. That is, the second binary search in this case is achieved by adding "1" and "8" and dividing the sum "9" by two. A value "1" is added to the integer part "4" of the obtained quotient "4.5", and the sum "5" is obtained as the number indicating the intermediate division 14-5.

It will be obvious to those skilled in the art that other changes, modifications and improvements may be made in the invention without departing from the scope of the invention as defined by the appended claims.

What is claimed is:

1. An electronic dictionary, comprising:
    input means for entering input data consisting of at least one character;
    display means for displaying said input data;
    a dictionary memory storing multiple sets of word data representative of a multiplicity of different words having different numbers of characters, in an alphabetical order, said dictionary memory consisting of a plurality of divisions of equal storage capacity, each of said plurality of divisions having a plurality of memory locations in which the corresponding sets of word data are stored, each of said memory locations having a storage capacity which corresponds to the number of characters of the word represented by the set of word data stored therein, and each of said plurality of divisions having an end memory location storing no part of any of said multiple sets of word data if said end memory location is not large enough to store the next set of word data in alphabetical sequence following the last set of word data stored in the respective division;
    search means connected to said dictionary memory and responsive to entry of said input data through said input means, for finding, in a binary search process, one of said plurality of divisions of the dictionary memory which is assigned to store the set word data representative of said input data entered through said input means, said search means sequentially scanning said one of the plurality of divisions to search the set of word data representative of said input data; and
    indicator means connected to said search means, for indicating whether said set of word data representative of said input data has been found or not.

2. An electronic dictionary as recited in claim 1, wherein the number of said plurality of divisions is equal to $2^n$, where n is a positive whole-number exponent.

3. An electronic dictionary as recited in claim 1, wherein said indicator means is connected to said display means to command said display means to display said input data in a flickering manner if said search means has not found the set of word data representative of said input data, and command said display means to display said input data in a normal manner if said search means has found the set of word data representative of said input data.

4. An electronic dictionary as recited in claim 1, wherein said input means comprises multiple character keys corresponding to characters, and a space key, said search means initiating said binary search process upon operation of said space key after operation of at lest one of said multiple character keys.

5. An electronic dictionary as recited in claim 1, which further comprises first display control means connected to said input means and said display means, for enabling said display means to display said input data, said indicator means comprising second display control means connected to said search means and said display means, for enabling said display means to indicate whether the set of word data representative of said input data has been found or not.

6. A word processor having an electronic dictionary which comprises:
- input means for entering input data consisting of at least one character;
- display means for displaying said input data;
- a dictionary memory consisting of storing multiple sets of word data representative of a multiplicity of different words having different numbers of characters, in an alphabetical order, said dictionary memory consisting of a plurality of divisions of equal storage capacity, each of said plurality of divisions having a plurality of memory locations in which the corresponding sets of word data are stored, each of said memory locations having a storage capacity which corresponds to the number of characters of the word represented by the set of word data stored therein, and each of said plurality of divisions having an end memory location storing no part of any of said multiple sets of word data if said end memory location is not large enough to store the next set of word data in alphabetical sequence following the last set of word data stored in the respective division;
- search means connected to said dictionary memory and responsive to entry of said input data through said input means, for finding, in a binary search process, one of said plurality of divisions of the dictionary memory which is assigned to store the set of word data representative of said input data entered through said input means, said search means sequentially scanning said one of the plurality of divisions to search the set of word data representative of said input data; and
- indicator means connected to said search means, for indicating whether said set of word data representative of said input data has been found or not.

* * * * *